United States Patent [19]

Stallings

[11] Patent Number: 5,681,137
[45] Date of Patent: Oct. 28, 1997

[54] DRIVE FOR A TIRE LIFT MECHANISM

[76] Inventor: Hulon D. Stallings, 8730 Sarah La., Grosse Isle, Mich. 48138

[21] Appl. No.: 743,368

[22] Filed: Nov. 4, 1996

[51] Int. Cl.$^6$ ........................................................ B66D 1/04
[52] U.S. Cl. ............................ 414/463; 254/323; 464/120; 464/134
[58] Field of Search .......................... 224/42.21, 42.23, 224/42.24; 254/323; 414/463; 464/120, 121, 132, 134

[56] References Cited

U.S. PATENT DOCUMENTS

| | | | |
|---|---|---|---|
| 1,686,695 | 10/1928 | Heon | 464/120 |
| 2,661,130 | 12/1953 | Evans | 224/42.21 X |
| 3,330,431 | 7/1967 | Knecht . | |
| 3,539,152 | 11/1970 | Paul | 254/166 |
| 3,865,264 | 2/1975 | Kuhns . | |
| 4,174,797 | 11/1979 | Yasue et al. | 224/42.21 |
| 4,915,358 | 4/1990 | Stallings | 254/323 |
| 4,997,164 | 3/1991 | Kito et al. | 254/323 |
| 5,060,912 | 10/1991 | Guarr | 254/323 |
| 5,188,341 | 2/1993 | Greaves | 254/323 |
| 5,251,876 | 10/1993 | Stallings | 254/323 |
| 5,314,288 | 5/1994 | Schmidt | 414/463 |

FOREIGN PATENT DOCUMENTS 2072109A  9/1981  United Kingdom .

*Primary Examiner*—Karen B. Merritt
*Assistant Examiner*—Janice L. Krizek
*Attorney, Agent, or Firm*—Dykema Gossett PLLC

[57] ABSTRACT

The tire lift mechanism has a cable and a drive tube which includes an outer tube portion and an inner tube portion. The outer tube portion is telescopically mounted upon the inner tube portion. The drive tube is adapted to be selectively rotated to cause the cable to be raised and lowered thereby raising or lowering the spare tire. The lift mechanism also includes a driven shaft having an axis of rotation and structure for raising and lowering the cable. The driven shaft is selectively driven by the drive tube through a pivot coupling interposed therebetween. The pivot coupling has a pair of inner and outer tubular coupling members. The inner coupling member has an axially extending bore for receiving the axially extending driven shaft. The inner coupling member and the driven shaft extend into the interior of the inner tube portion. The outer coupling member is mounted on the exterior of the inner tube portion. Radially extending aligned openings are provided in the inner and outer coupling members, the inner tube portion and in the driven shaft. A radially extending connecting pin is mounted in the aligned openings for pivotally connecting the coupling members and the inner tube portion to the driven shaft. The driven tube and the driven shaft are operatively connected through the coupling members and pin such that the axis of rotation of the driven tube is non-parallel to the axis of rotation of the driven shaft.

8 Claims, 3 Drawing Sheets

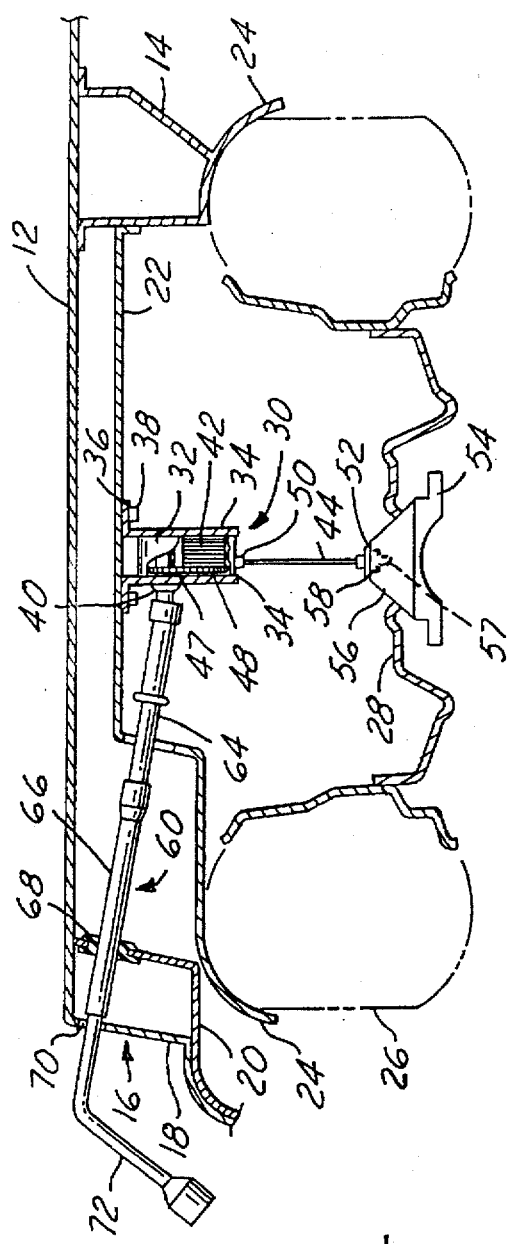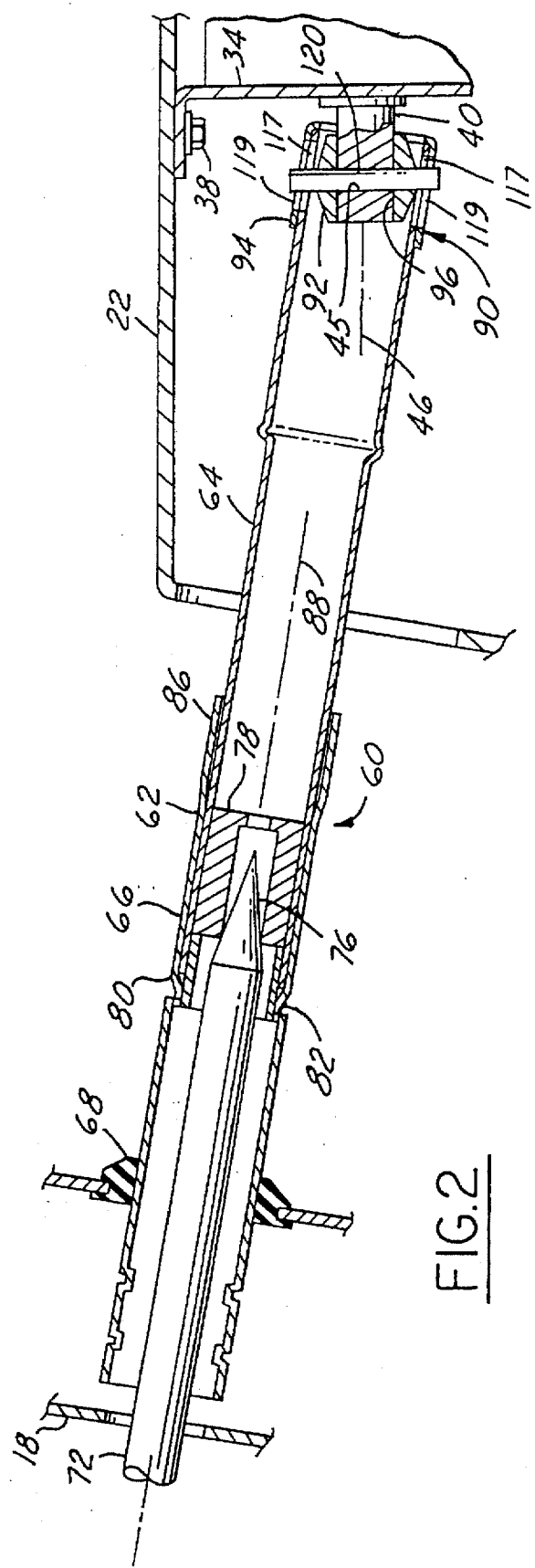

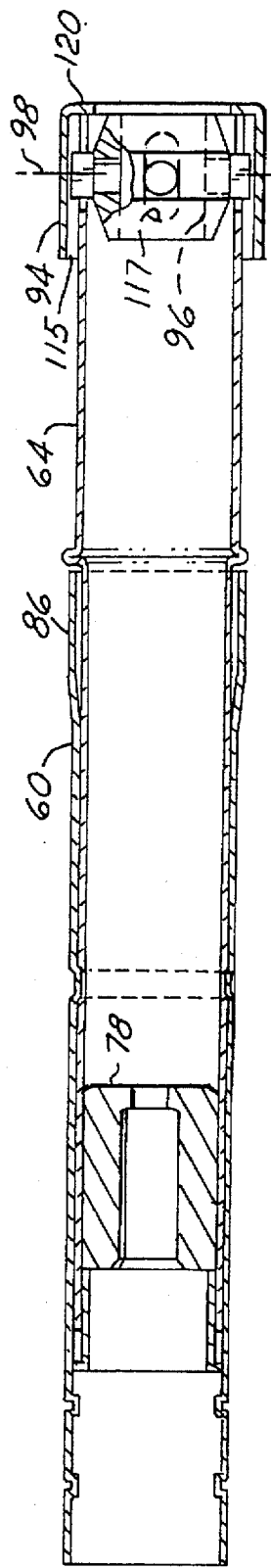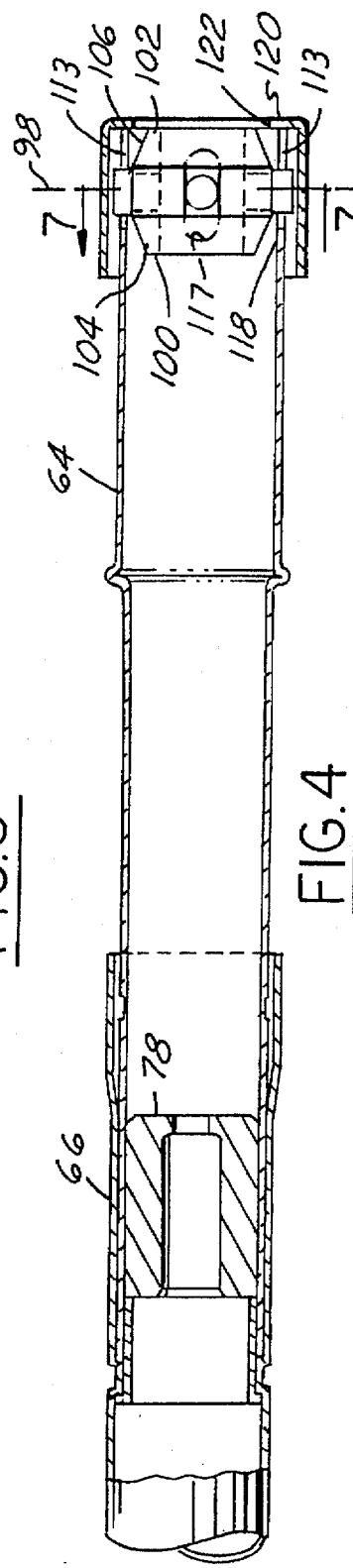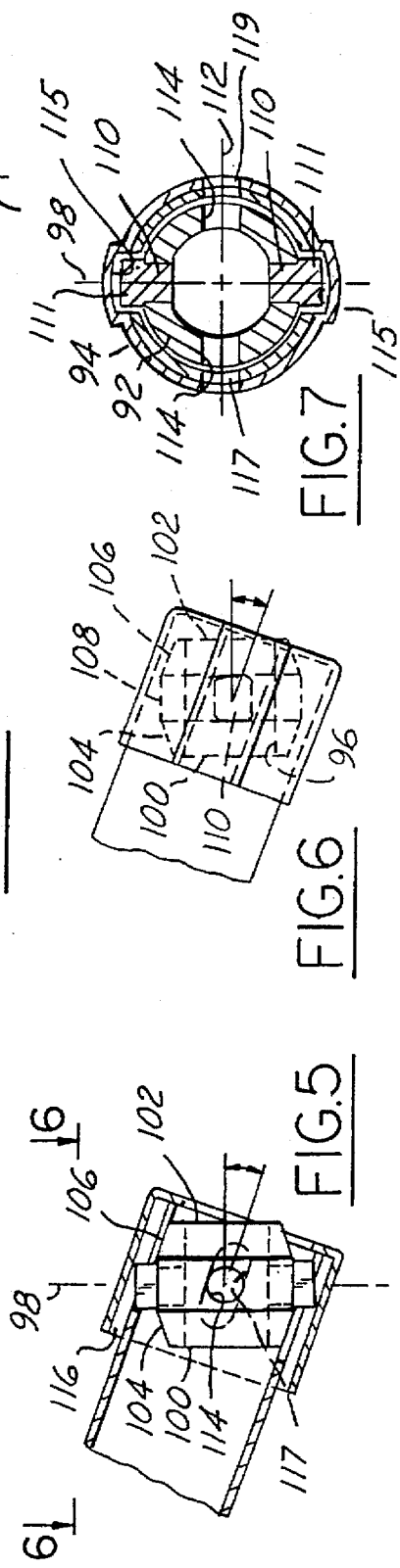

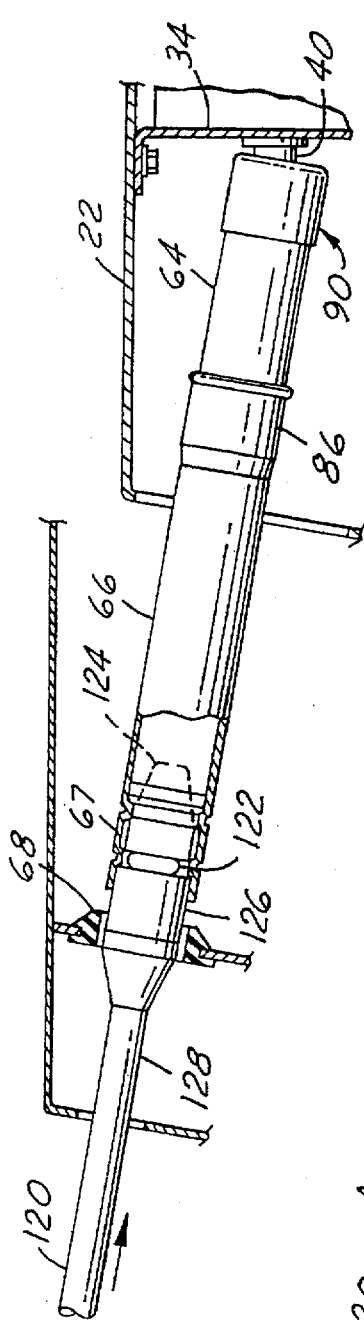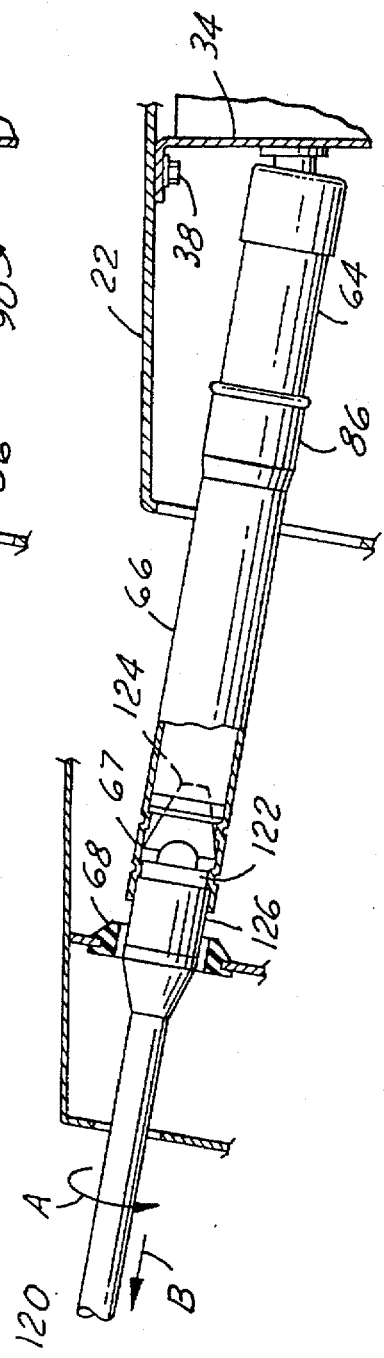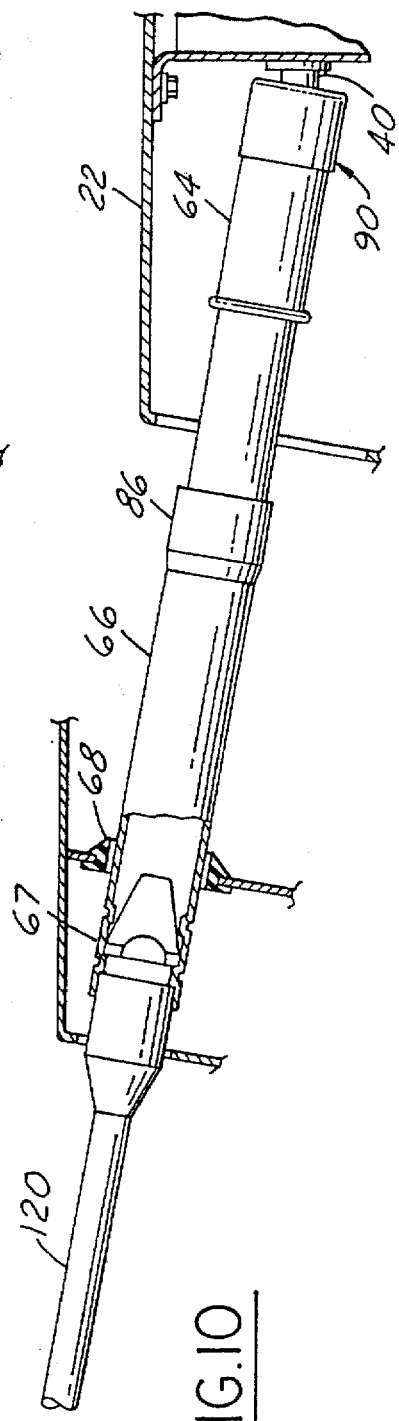

DRIVE FOR A TIRE LIFT MECHANISM

BACKGROUND OF THE INVENTION

This application relates in general to an improved drive for a tire lift mechanism. It is well known to store a spare tire at the underside of a vehicle, particularly in vans. Tire lift mechanisms are typically utilized for rising and lowering the spare tire from beneath the vehicle. A cable extends from the lift mechanism and a rotative drive is arranged upon a first axis for lowering and rising the cable, to raise and lower the spare tire. An access opening may be formed through the rear of the vehicle body, and a tool such as a jack handle may be inserted through the access opening and used to raise and lower the cable.

In U.S. Pat. No. 4,915,358, a drive tube is selectively driven by a tool for raising and lowering a cable. The drive tube is rotatably received in a bearing formed beneath the underside of a vehicle, and drives a driven shaft, which is connected to the actual drive for the cable. The connection between the drive tube and the driven shaft is a universal-type connection wherein the drive tube has a plurality of circumferentially-shaped drive pins received in slots in the driven shaft. The drive pins may pivot relative to the slots such that the axis of rotation of the drive tube may be at an angle relative to the axis of rotation of the driven shaft. This facilitates the use of the assembly, such that a user is not required to bend to a low vertical position to raise and lower the tire.

In U.S. Pat. No. 5,251,876, a drive tube is connected to a driven shaft through a universal connection which includes a number of drive pins fixed to the drive tube and received in notches in the driven shaft. The pins may pivot within the notches, but still transmit drive. The universal connection includes spaces between the drive pins which extend radially outwardly of the connection. The drive tube also includes plates spaced on each axial side of a driven shaft plate which includes the notches. The drive pins extend between the drive tube plates. A spring is positioned between the driven shaft plate and one of the plates from the drive tube. This spring ensures that the drive tube is biased towards the driven shaft, eliminating rattling and undesirable looseness in any relative angular position.

SUMMARY OF THE INVENTION

The tire lift mechanism of the present invention comprises a drive tube including an outer tube portion and an inner tube portion. With such a construction, the outer tube portion is telescopically mounted on the inner tube portion. The lift mechanism further includes a driven shaft having an axis of rotation along with structure for raising and lowering a cable which forms part of the tire lift mechanism. The drive tube is operatively connected to the driven shaft by a pivot coupling.

The pivot coupling forming part of the present invention has a pair of inner and outer tubular coupling members, with the inner coupling member having an axially extending opening for receiving the axially extending driven shaft. The inner coupling member and the driven shaft extends into the interior of the inner tube portion. The outer coupling member is mounted on the exterior of the inner tube portion. Radially aligned holes are provided in the inner and outer coupling members, the inner tube portion and in the driven shaft. A radially extending connecting pin is mounted in the aligned holes for pivotly connecting the coupling members and the inner tube portion to the driven shaft. With such a construction, the drive tube and the driven shaft are operatively connected through the inner and outer tubular coupling members and pin such that the axis of rotation of the drive tube may be non-parallel to the axis of rotation of the driven shaft.

A feature of the present invention is to provide a tire lift mechanism which is simple in construction, easy to manufacture and efficient in operation.

Further features of the present invention can be best understood from the following specification and drawings, of which the following is a brief description.

BRIEF DESCRIPTION OF THE DRAWINGS

FIG. 1 is a largely schematic cross sectional view of the tire lift mechanism and the underside of a vehicle and illustrating the assembly of the spare tire into a supporting bracket held in place by the tire lift mechanism.

FIG. 2 is a longitudinal cross sectional view through the tire lift mechanism shown in FIG. 1.

FIG. 3 is a longitudinal sectional view through the drive tube and pivot coupling, with the outer tube portion of the drive tube in a forward position or collapsed on the inner tube portion.

FIG. 4 is a view similar to FIG. 3 but illustrating the outer tube portion of the drive tube in an extended position relative to the inner tube portion and the pivot coupling.

FIG. 5 is a fragmentary view of the inner tube portion and the pivot coupling.

FIG. 6 is a top view of the inner tube portion and pivot coupling shown in FIG. 5.

FIG. 7 is a sectional view taken on the line 7—7 of FIG. 4

FIG. 8 illustrates one of the first steps in assembling the tire lift mechanism of the present invention to a vehicle.

FIG. 9 illustrates a subsequent step in assembling the tire lift mechanism to a vehicle.

FIG. 10 shows the final step in the assembling the tire lift mechanism to a vehicle.

DESCRIPTION OF A PREFERRED EMBODIMENT

Referring now to the drawings, a vehicle, such as a van, includes a rear floor 12 and a vehicle frame which includes the rear floor support cross member 14 and a transverse rear panel 16 including an outer rear sill 18 which is connected to the floor 12 and to the inner sill 20.

A spare wheel mount bracket 22 includes a pair of opposed arcuate depending portions 24. A forward portion of the spare wheel mount bracket 22 is secured to the cross member 14 by appropriate fasteners, not shown. A rear portion of the spare wheel mount bracket 22 is secured to the inner sill 20 by appropriate fastening devices, not shown.

The spare wheel 26, shown in phantom in FIG. 1, has a central or apertured wheel mount flange 28 which further bears against an intermediate support bracket, not shown, which is secured to the vehicle frame in the usual manner and cooperates with bracket 22 for mounting and storing the spare tire 26.

In order to mount and store the spare tire 26, there is provided a lift assembly or mechanism 30 which may have a gear and pinion lift assembly in the casing 32 located between a pair of opposed side plates 34. The side plates 34 are provided with mount flanges 36 bearing against a central undersurface of the bracket 22 (FIG. 1) and are secured thereto by appropriate fastening devices 38. The lift assembly 30 includes a rotatable drive shaft or driven shaft 40 which is adapted to rotate a suitable drum 42 upon which is anchored and wound the flexible cable 44. The input or driven shaft 40 is arranged upon a first axis or axis of rotation 46 and has a pin opening 45. The lift assembly 30 includes a pinion 47 in mesh with a gear 48 upon the axis of rotation of the drum 42. This constitutes one means for rotating the drum 42 for advancing or retracting the cable 44 through the guide 50.

The cable 44 extends through a flanged sleeve 52 located in the spare wheel support 54. Support 54 is constructed of a non-metallic material and includes a centering cone 56 in cooperative registry within the conventional central aperture of wheel mount flange 28, FIG. 1.

Cable 44 terminates in an anchor tube 57 secured upon the end thereof and including an enlarged head 58 connected to the spare wheel support 54. Through rotation of the driven shaft 40 upon axis 46, the cable 44 is advanced or retracted. The cable 44, as shown in FIG. 1, is illustrated in a fully retracted position, with the lift assembly 30 holding the cable 44 and the spare wheel support 54 in operative supporting relation with respect to the wheel mount flange 28 thereby holding the spare tire 26 in registry within the corresponding opposed arcuate depending portions 24 of the spare wheel mount bracket 22.

Applicant has described heretofore a spare wheel lift assembly for a vehicle which has a frame and a downwardly facing mount bracket 22 secured upon the underside of the frame which is adapted to receive a spare wheel 26. The applicant has further described a lift mechanism centrally underlying the bracket 22 and secured thereto including a cable 44 extending therefrom and a rotative drive 30 arranged upon a first axis 46 connected to the cable 44 for selectively extending and retracting the cable 44 and the spare wheel support 54 connected to the cable.

The present invention relates to an improvement in the tire lift mechanism. A manual drive assembly 60 is provided for selectively driving the lift assembly or mechanism 30 to raise and lower cable 44. The manual drive assembly 60 includes a drive tube 62 which selectively drives the driven shaft 40. Driven shaft 40 drives or operates the gear 48 and pinion 47 within the lift assembly or mechanism 30 to raise and lower the cable 44.

The drive tube 62 consists of a first inner tube portion 64 and a second outer tube portion 66. The outer tube portion 66 is rotatably received within the bearing 68 provided on the underside of the floor 22. The second outer tube portion 66 rotates with the inner tube portion 64. The outer tube portion 66 has an elongated split, not shown, and is telescopically received on the inner tube portion 64. The outer tube portion 66 is arranged to slide on the inner tube portion 64 as will subsequently appear. A pair of radial inwardly extending ears 67 are formed in outer tube 66. One ear 67 extends across the split.

An access opening 70 is provided in the panel 18 of the vehicle. A tool such as a jack handle 72 may be inserted through the access opening 70 and into the outer tube or tube portion 66 and may be used to rotate the outer tube portion 66 and the inner tube portion 64 which in turn rotates the driven shaft 40. It should be appreciated that other tools may be used such as the tool disclosed and described in U.S. Pat. No. 5,251,876. In addition, other types of tools may be used such as a lug wrench. The rotation of the driven shaft 40 raises and lowers the cable 44 to raise and lower the spare tire 26.

The jack handle or tool 72 has a first tapered end 76 which is received within a drive connection 78 located in the interior and at one end of the inner tube portion 64. The outer tube or tube portion 66 has a lip 80 which snaps into a notch 82 provided in the inner tube 64, thereby locking the inner and outer tubes 64 and 66 together thereby preventing any telescopic movement therebetween. A forward end of the outer tube or tube portion 66 is angled outwardly at 86 to facilitate sliding of the outer tube 66 on the inner tube 64.

The drive tube 60 has an axis of rotation 88 and is connected to the driven shaft 40 by a pivot coupling 90 which includes an inner tubular coupling member 92 and an outer tubular coupling member 94. The inner tubular coupling 92 has a straight through bore or opening 96 of the same cross-section or configuration as the driven shaft 40 which extends through bore 96 (FIG. 2). The inner tubular coupling member 92 (FIGS. 3–5 and 7) has a first axis 98 midway between the generally flat end surfaces 100 and 102. The outer surface of the inner tubular coupling 92 has a pair of conical or tapered portions 104 and 106, located on opposite sides of the cylindrical portion 108. The tapered portions 104, 106 terminate in surfaces 100 and 102, respectively. Intermediate the conical portions 104 and 106 are a pair of trunnions 110 located on axis 98 and projecting outwardly from the cylindrical portion 108. The trunnions 110 have enlarged heads 111.

The inner tubular coupling member 92 has a second axis 112 (FIG. 7) which extends through a pair of opposed holes 114 formed therein for receiving a connecting pin as will be subsequently described.

The outer tubular coupling member 94 has a pair of opposed grooves 115 for receiving the heads 111 of the trunnions 110. The coupling member 94 is opened at one end 116 in order to receive the forward end 118 of the inner tube portion 64. The other end of the coupling member 94 is provided with an inwardly mined annular flange 120 having a center opening 122. The flange 120 closes the adjacent ends of the grooves 115.

The forward end 118 of inner tube portion 64 is provided with a pair of opposed slots 113 open at the ends and a pair of closed slots 117, located at 90° from slots 113 (FIG. 2). The outer coupling member also has a pair of opposed slots 119 which overlie the slots 113 of the inner tube portion 64 as illustrated in FIGS. 2 and 7.

FIGS. 2 and 8–10 illustrate steps for assembling the drive tube 62 on the driven shaft 40. Initially the outer tube 66 and the inner tube 64 are telescopically received on each other in a collapsed position. At such time the drive tube 62 and the driven shaft 40 extend coaxially along the horizontal axis 46. The inner coupling part 92 is telescoped over the driven shaft 40 and the outer coupling member 94 is slid over the forward end of the tube 64 (FIG. 3). A pin 120 extends through the aligned openings and slots provided in the tube 64 inner and outer coupling members 92 and 94 and in the driven shaft as shown in FIG. 2. The end of the collapsed drive tube 62 remote from the pin 120 is then lifted from the horizontal to an inclined position as shown in FIG. 8, with the axis of rotation of the driven tube 62 at an angle to the axis of rotation 46 of the driven shaft 40. The pivot coupling 90 permits the driven tube 62 to be raised, with the ends of the pin 120 moving relative to the slots 113 of the inner tube 64 and relative to the slots 119 of the outer coupling member 94.

Thereafter it is necessary to locate the cylindrical drive tube 62 in its proper orientation within the vehicle structure. The outer tube 66 includes an elongate split, not shown, which facilitates the sliding movement of the outer tube 66 on the inner tube 64.

FIGS. 8–10 inclusive show a tool 120 for facilitating the assembly of the drive tube 62 to the underside of the vehicle. Tool 120 is of the type shown and described in U.S. Pat. No. 5,251,876. It includes a lock portion 122, received between forward end 124 and rearward end 126. Lock portion 122 has a cross section somewhat similar to the cross section of the forward end 124, adjacent lock portion 122. Rearward end 126 has a larger diameter than lock portion 122. A suitable handle, not shown, is provided on the stem 128 of the tool.

The tool 120 is inserted into the outer end of the outer cylindrical outer tube portion 66 until the lock portion 122 is axially aligned with a pair of radially inwardly extending ears 67 formed in the outer tube 66. One of the ears 67 extends across the split provided in the outer tube portion 66. Thereafter the rearward end, which has a greater outer diameter than the lock portion 122 or the forward end 124, abuts the ears 67, thereby stopping further forward movement of the tool 120 into the outer tube portion 66 and defining this axial position.

The next step, illustrated in FIG. 9, is to rotate the tool 120 in the direction of arrow A. Once tool 120 is rotated, various portions of the tool are engaged and aligned with the ears 67 provided on the outer tube portion 66. Due to the configuration of the tool and the engagement thereof with the outer tube 66, it is impossible to remove the tool 120 from the outer tube 66. Tool 120 is thereafter pulled outwardly as represented by the direction of arrow B in FIG. 9. Such axial movement telescopes the outer tube 66 on the inner tube 64 and moves the leading end of the outer tube 66 through the bore of the bushing 68 from the position shown in FIG. 9 to the position illustrated in FIG. 10 where the outer tube 66 is rotatively received in the bearing 68. The mechanism or drive tube 62 is now in a fully assembled position such as is illustrated in FIG. 2. When the outer tube 66 has been extended relative to the inner tube 64 (FIGS. 2 and 5) the lip 80 is directed into the notch 82 and the outer tube 66 is locked or held relative to the inner tube 64. Once the drive assembly 62 has been installed and appropriately mounted on the underside of the vehicle, the tool 120 is rotated and released from the outer tube 66. Thereafter the tool 120 is removed from the tube assembly.

While this invention has been described with reference to a preferred embodiment, it is to be expressly understood that further modifications or variations may be easily made by any one of ordinary skill in the art without departing from the spirit and the scope of this invention as defined by the appended claims.

What I claim is:

1. A tire lift mechanism comprising:

a cable;

a drive tube having an axis of rotation and including an inner tube portion and an outer tube portion, with the outer tube portion being telescoped over the inner tube portion;

a driven shaft having an axis of rotation and a rotative structure connected to the cable for raising and lowering said cable, said driven shaft being selectively driven by said drive tube;

a pivot coupling interposed between said driven shaft and said drive tube;

said pivot coupling having a pair of inner and outer tubular coupling members, said inner coupling member having an axially extending opening for receiving said driven shaft, said inner coupling member and said driven shaft extending into the interior of said inner tube portion, said outer coupling member being mounted on the exterior of said inner tube portion;

radially extending and aligned openings provided in said inner and outer coupling members, said inner tube portion and in said driven shaft; and a radially extending connecting pin mounted in said aligned openings for connecting said coupling members and said inner tube portion to said driven shaft, said driven tube and said driven shaft being operatively pivotally connected through said coupling members and said pin such that the axis of rotation of said drive tube is non-parallel to the axis of rotation of said driven shaft.

2. The tire lift mechanism as recited in claim 1, wherein a pair of axially extending grooves are provided in said outer tubular coupling member, said inner coupling member having a pair of radially extending trunnions having an axis and extending into said grooves provided in said outer tubular coupling member to guide the movement of said inner coupling member in said inner tube portion.

3. The tire lift mechanism as recited in claim 1, wherein the openings in said inner coupling member have diameters equal to the diameter of said pin.

4. The tire lift mechanism as recited in claim 1, wherein the openings in said inner tube portion and in said outer coupling member are slots for receiving the ends of said pin thereby facilitating the angular movement of said tube portions relative to said pin and coupling members.

5. The tire lift mechanism as recited in claim 2, wherein the openings in said inner tubular coupling member are in the form of a pair of aligned holes arranged on an axis which is perpendicular to the axis of said trunnions.

6. The tire lift mechanism as recited in claim 2, wherein the outer surface of said inner coupling member includes a pair of tapered portions which permit the inner coupling member to pivot or move within the confines of the inner tube portion upon actuation of the drive tube.

7. The tire lift mechanism as recited in claim 6, wherein said outer coupling member has an inwardly turned annular flange which closes the grooves at one end thereof and assists in preventing the separation of the inner and outer coupling members.

8. The tire lift mechanism as recited in claim 6, wherein said inner coupling member includes a centrally located cylindrical portion between said tapered portions; said trunnions being located on said cylindrical portion.

* * * * *